C. T. DRAKE & J. L. NEEDHAM.
WRAPPING MACHINE.
APPLICATION FILED APR. 8, 1914.
1,285,646.
Patented Nov. 26, 1918.
14 SHEETS—SHEET 7.
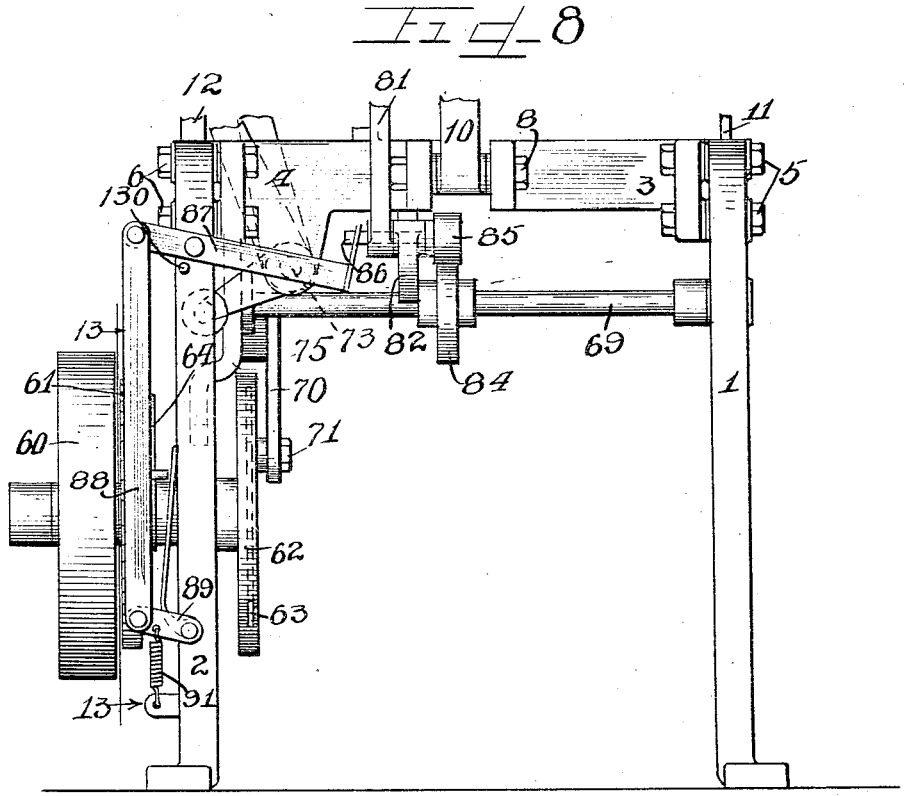
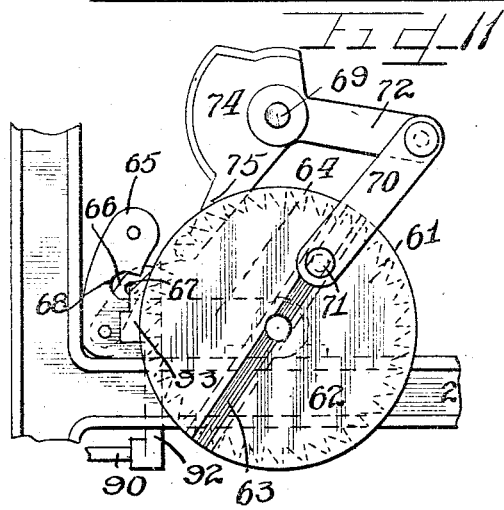
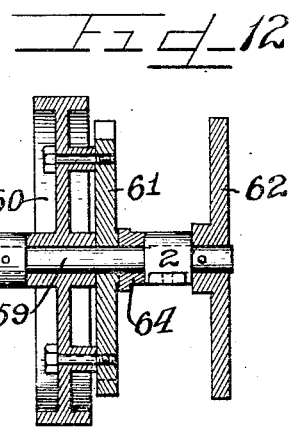
Witnesses
J. W. Angell
Charles W. Hills Jr.
Inventors
Chester T. Drake
John L. Needham
by Charles W. Hills Atty.

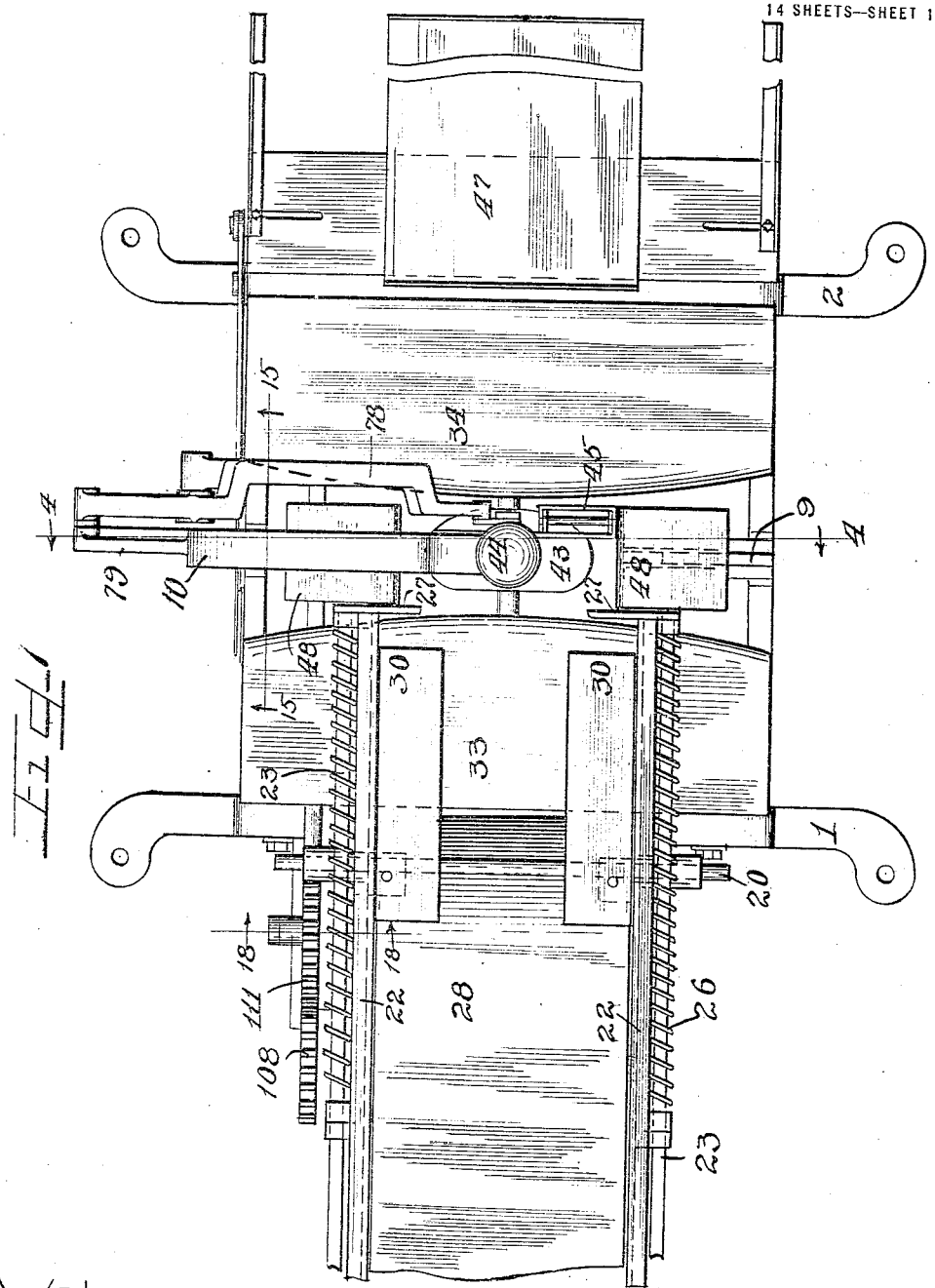

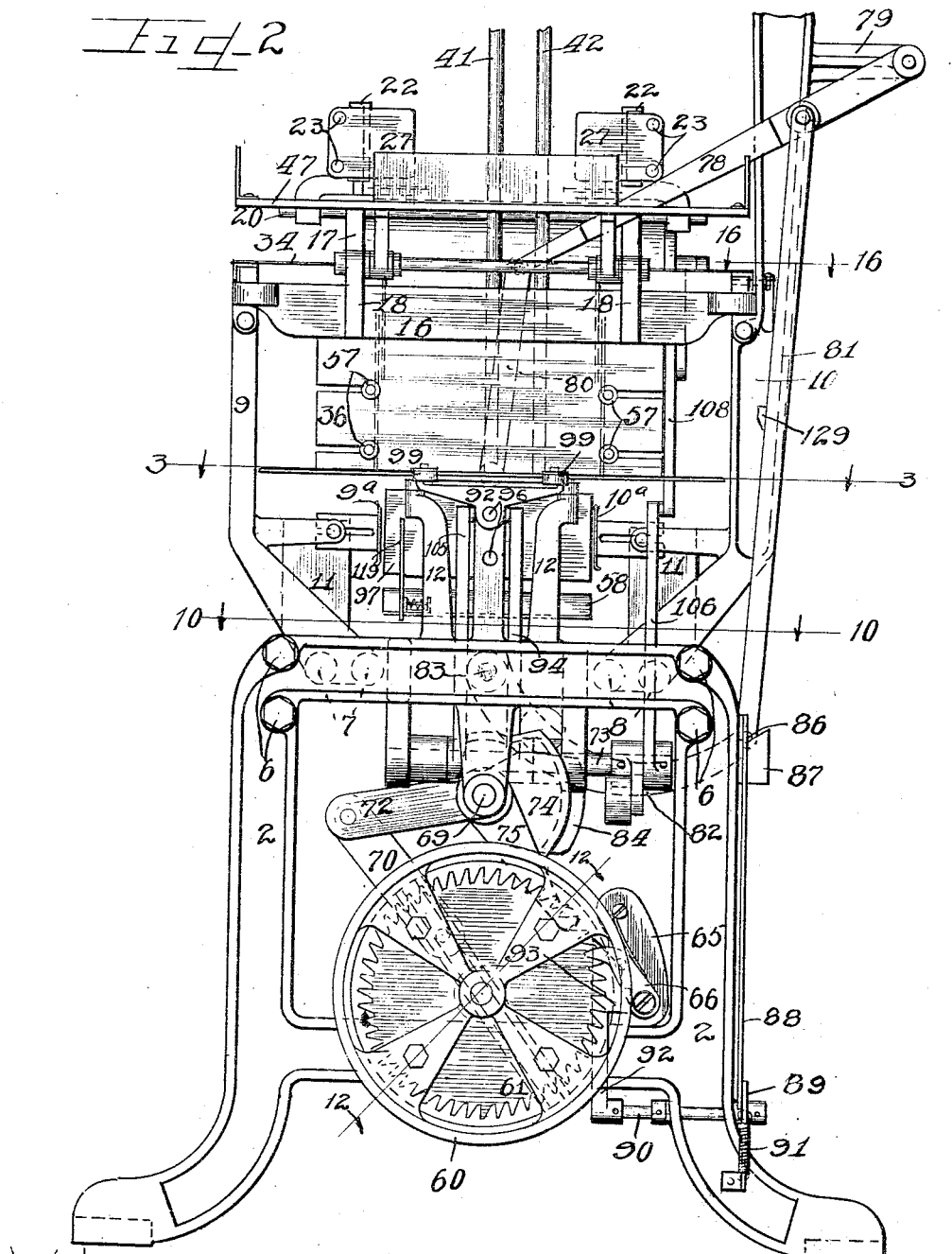

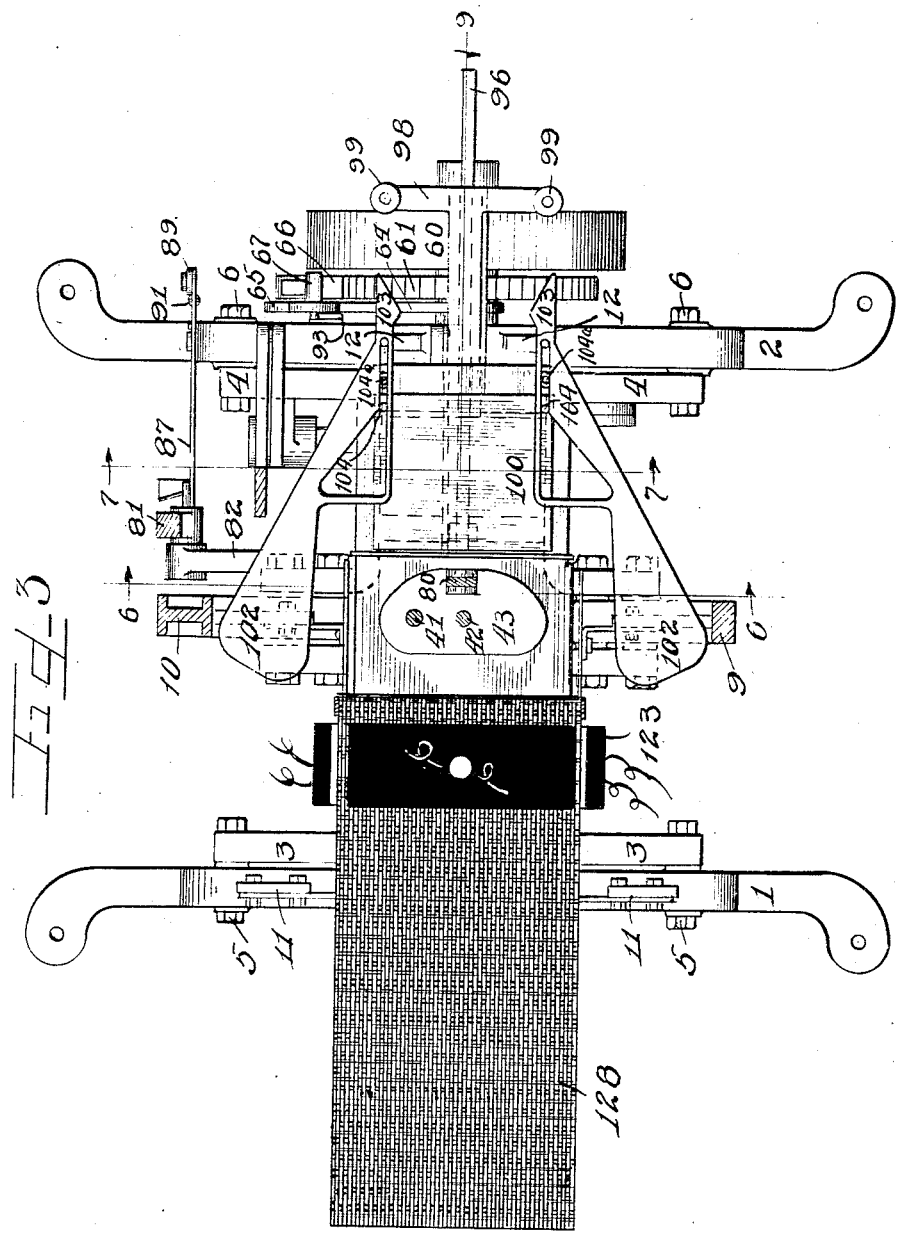

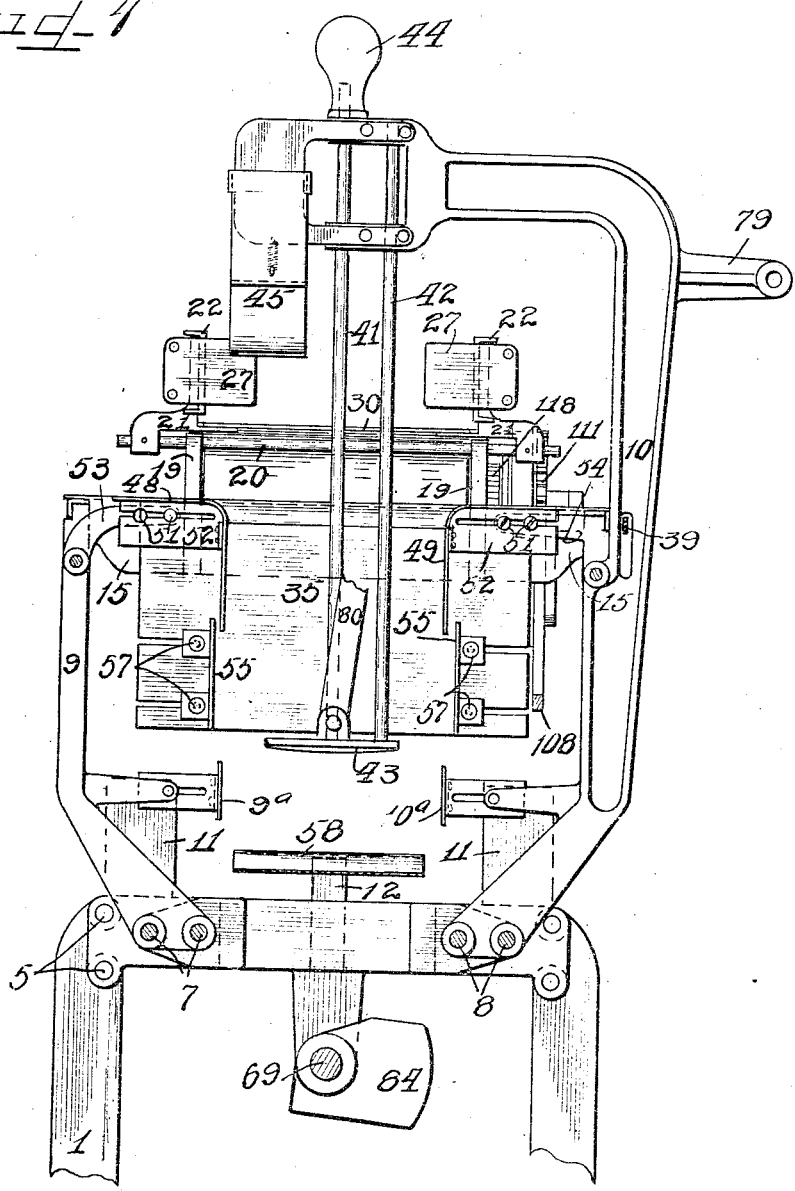

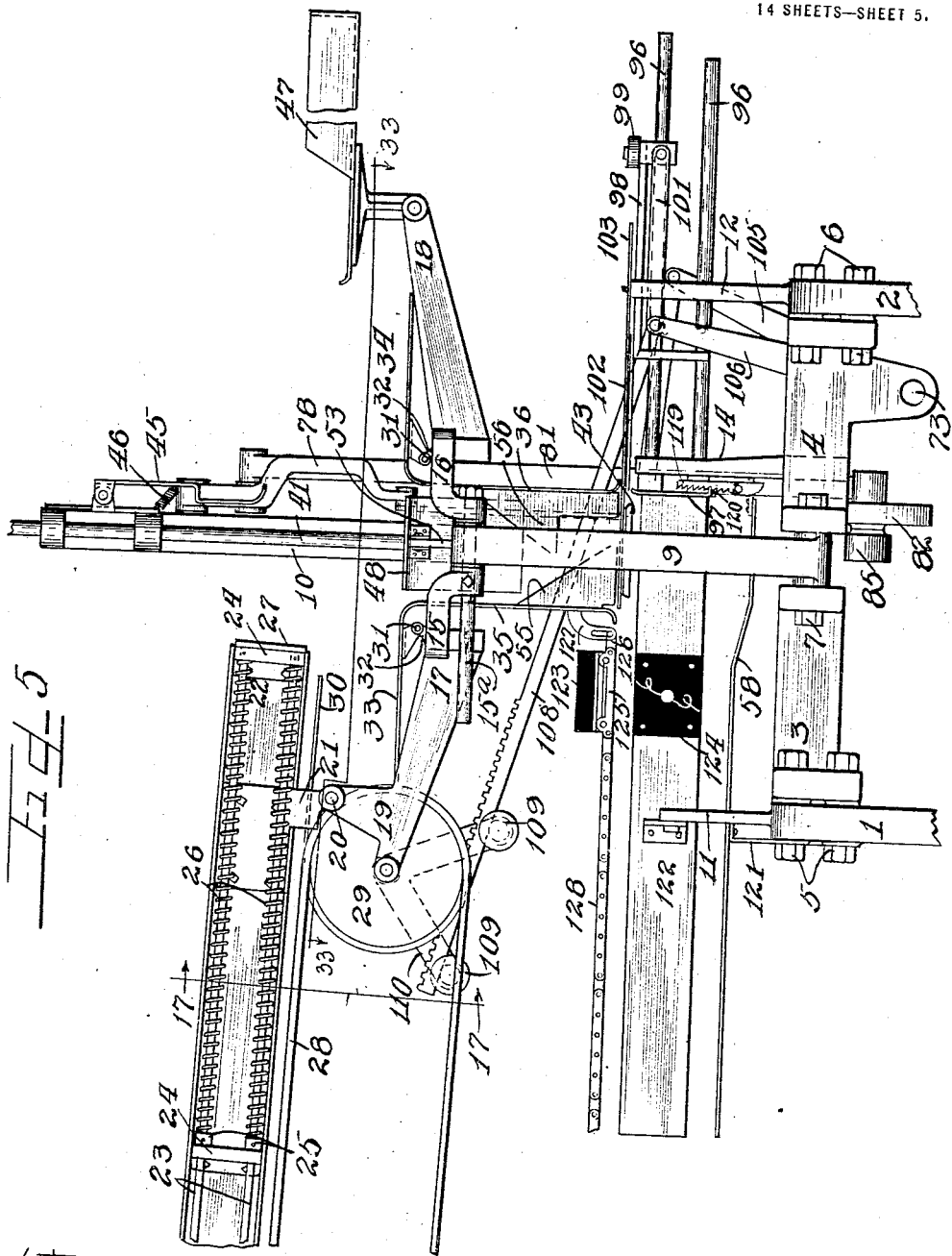

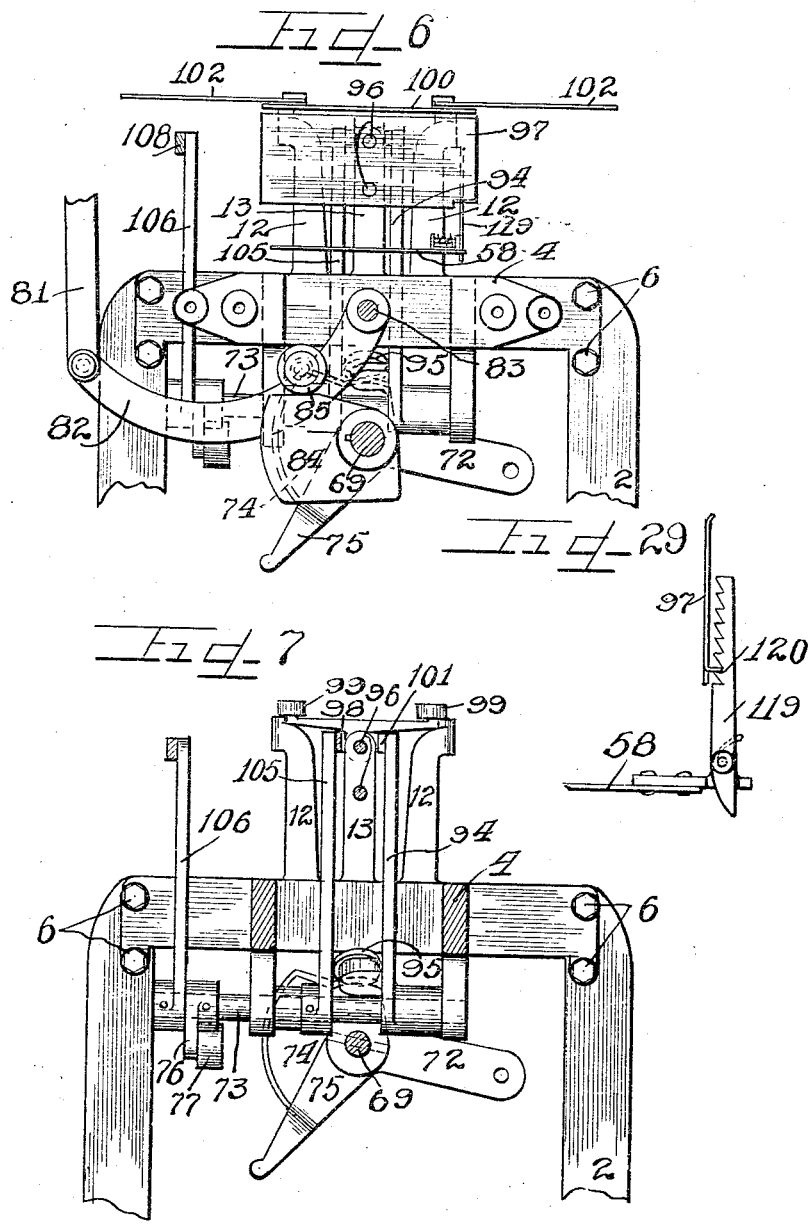

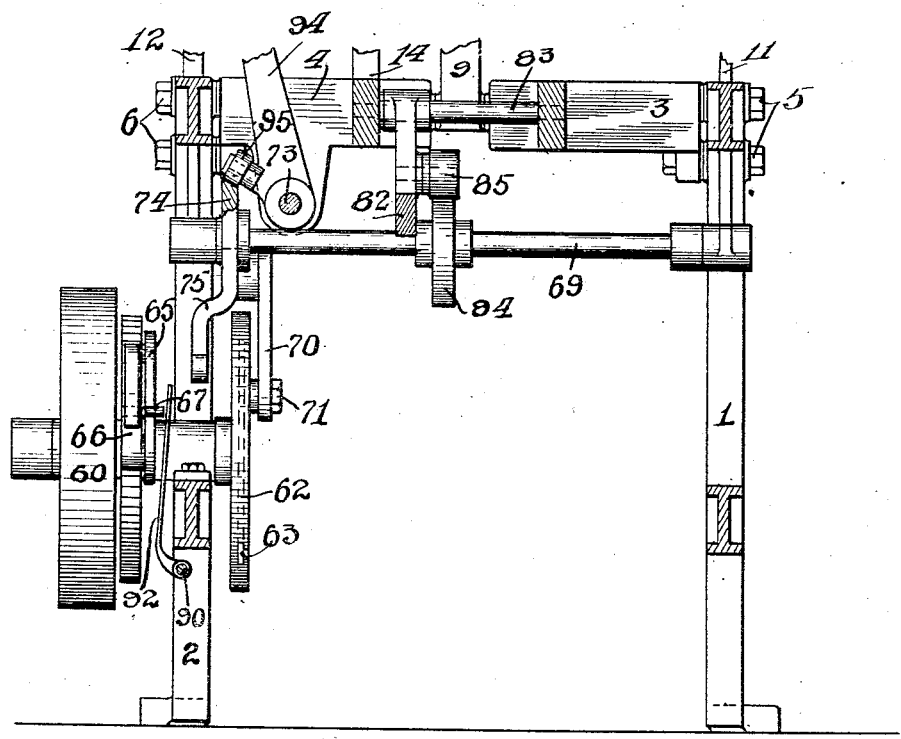
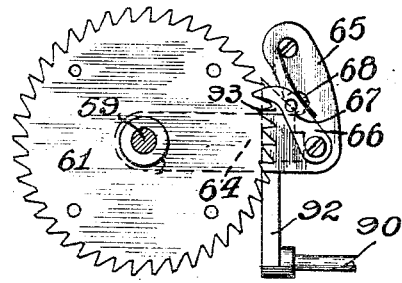
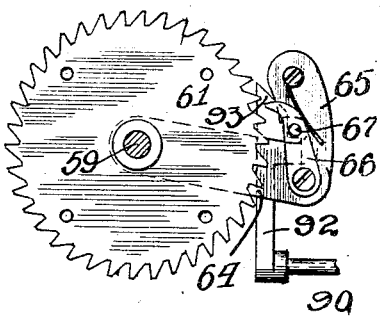

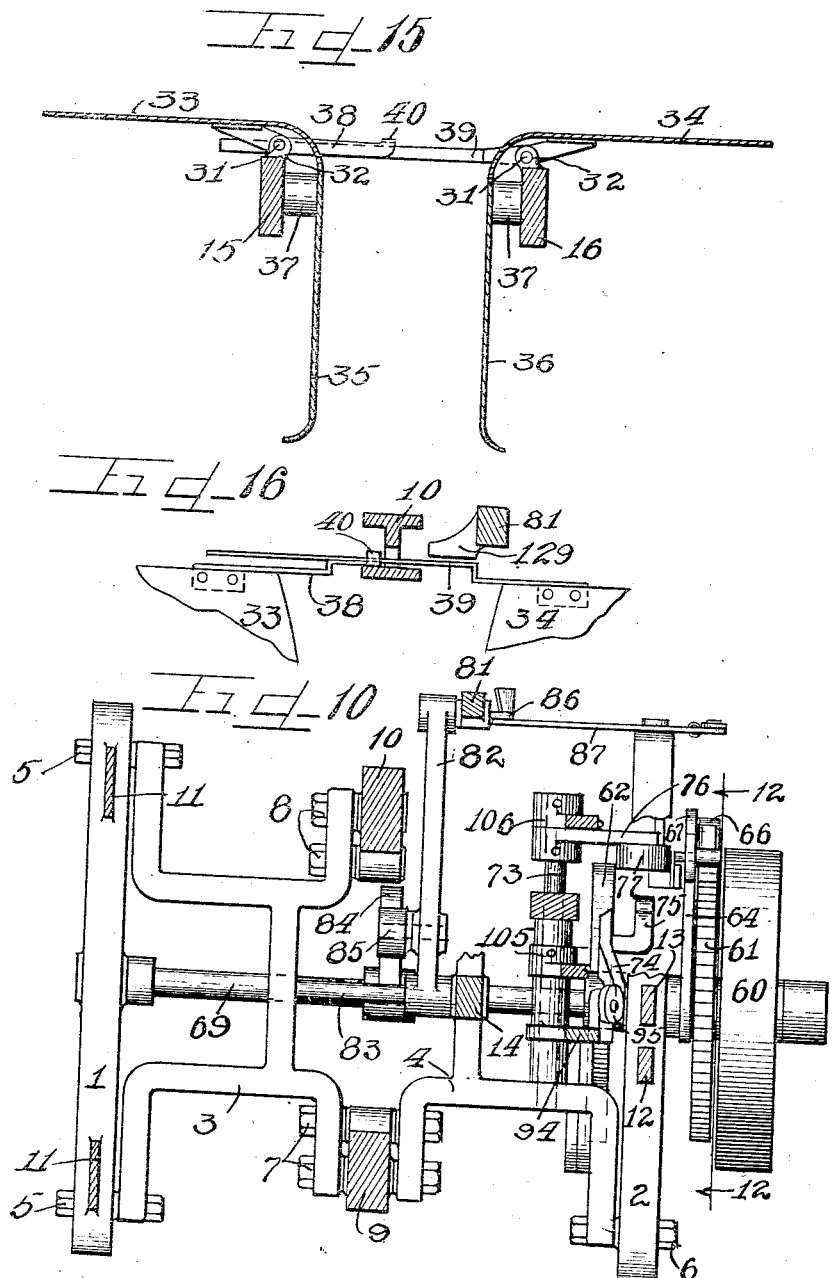

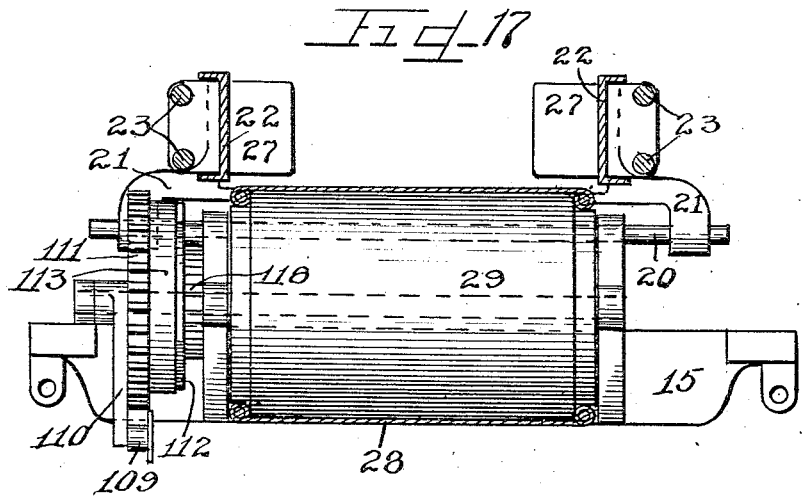
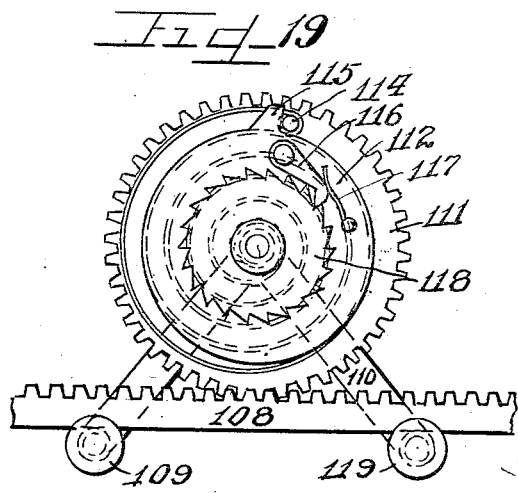
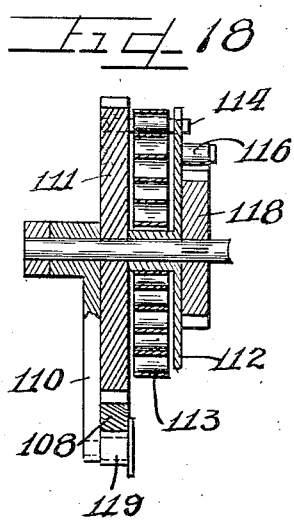

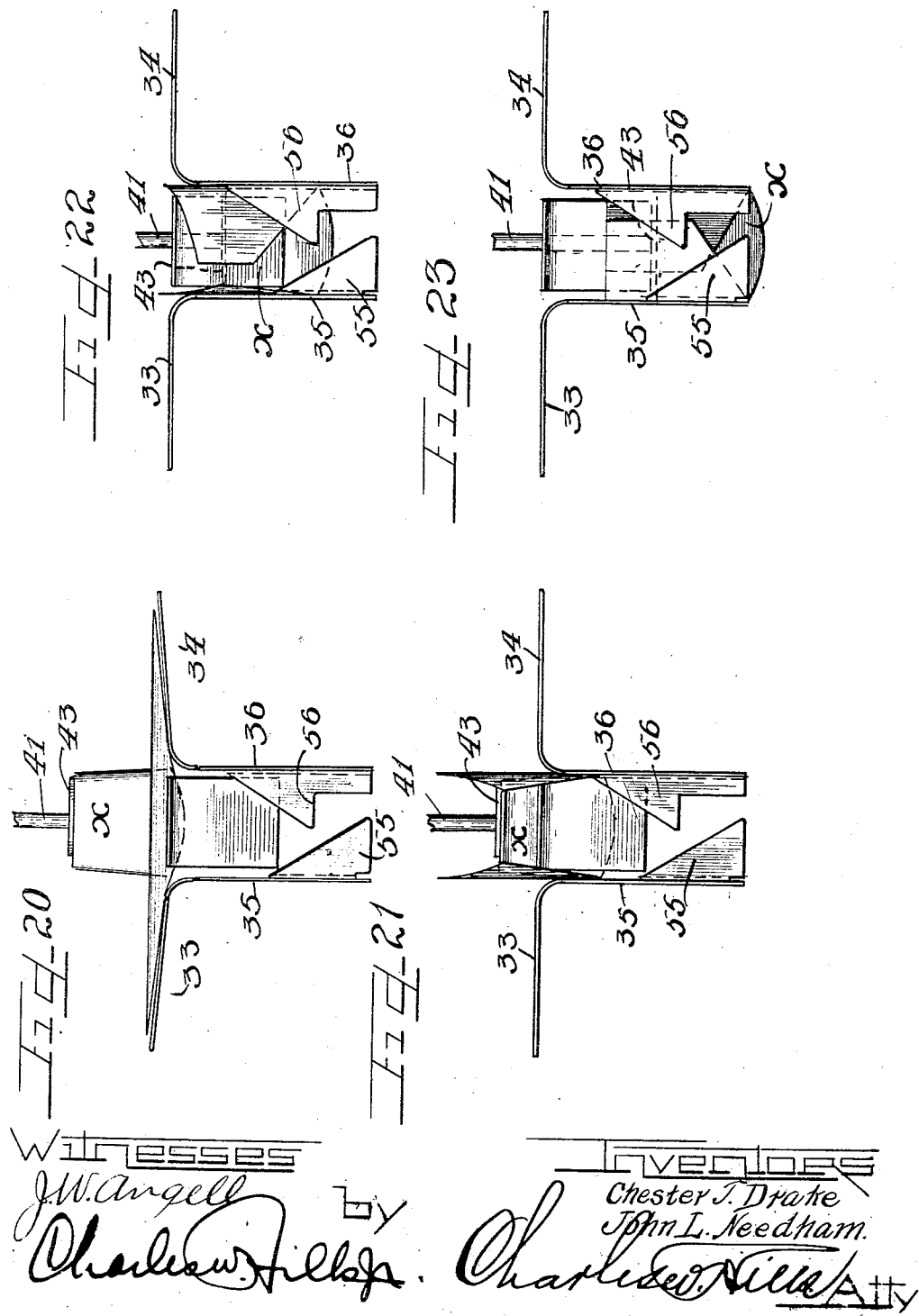

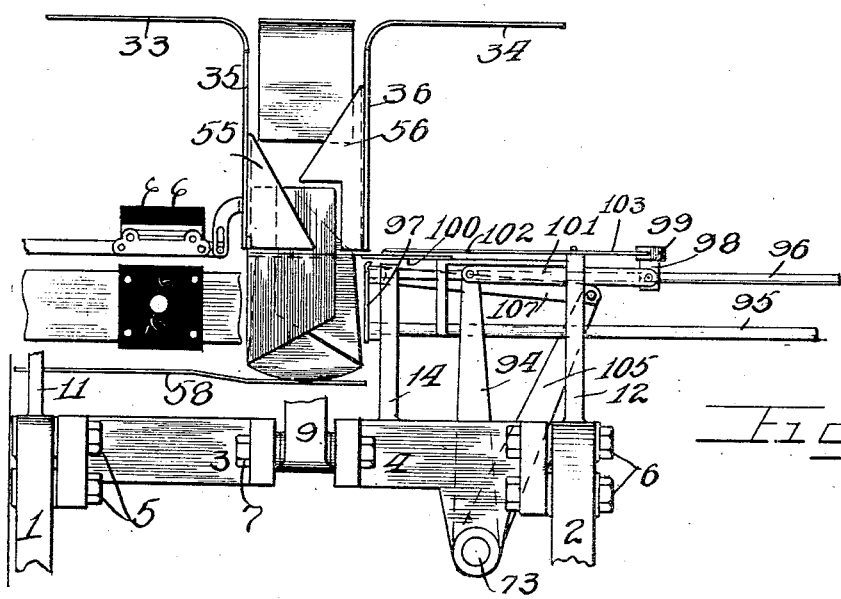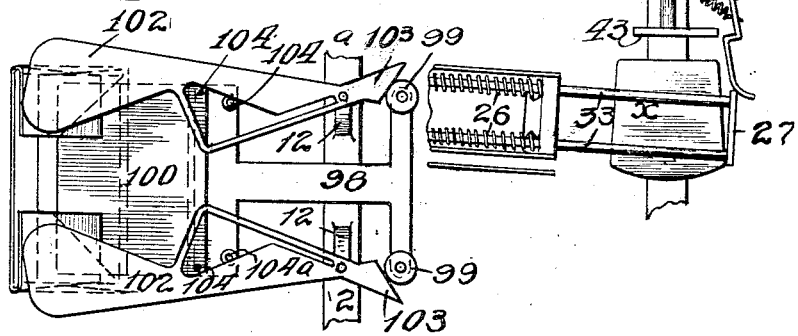

C. T. DRAKE & J. L. NEEDHAM.
WRAPPING MACHINE.
APPLICATION FILED APR. 8, 1914.
1,285,646.
Patented Nov. 26, 1918.
14 SHEETS—SHEET 13.
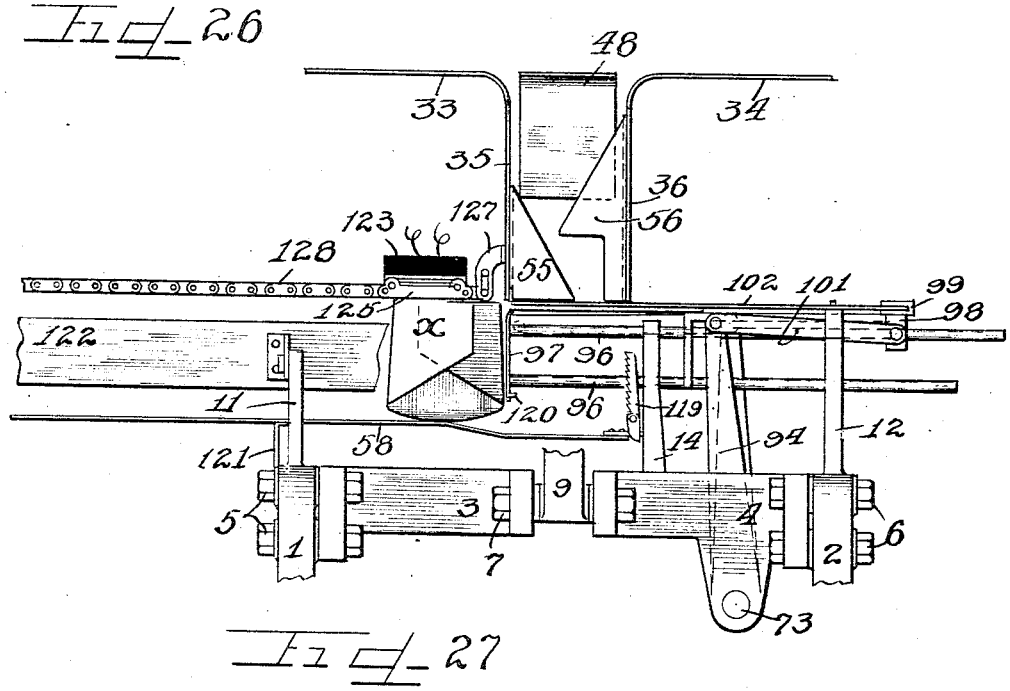
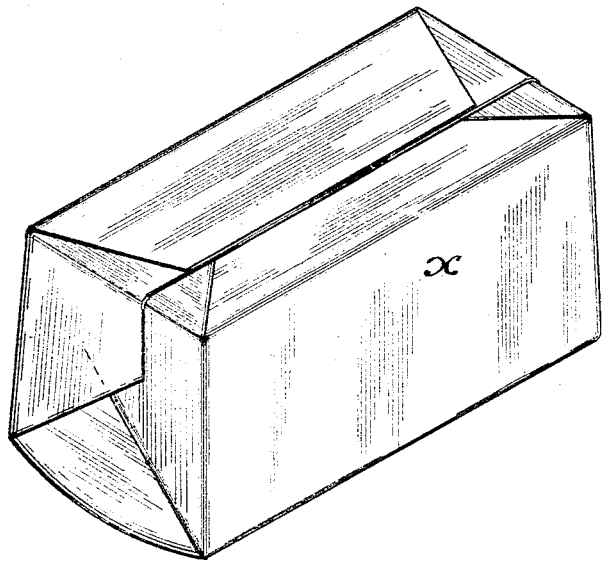

C. T. DRAKE & J. L. NEEDHAM.
WRAPPING MACHINE.
APPLICATION FILED APR. 8, 1914.
1,285,646.
Patented Nov. 26, 1918.
14 SHEETS—SHEET 14.
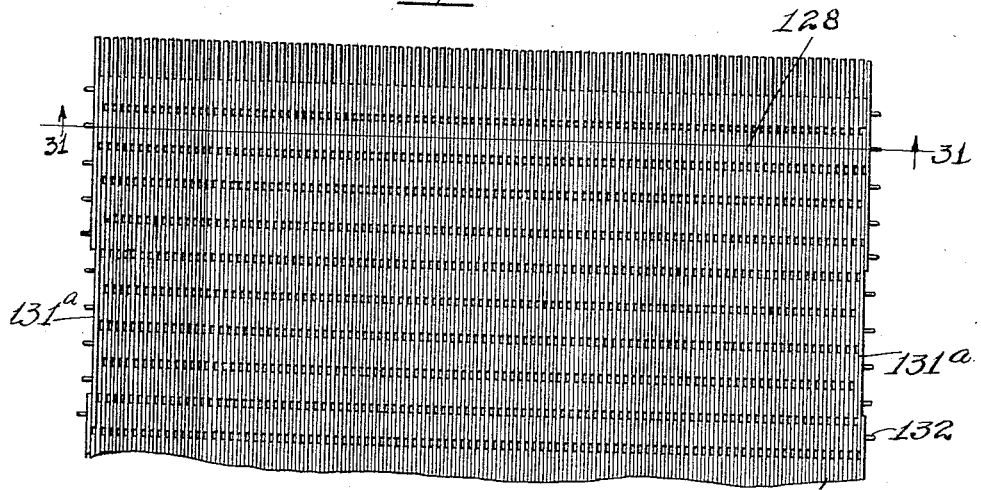
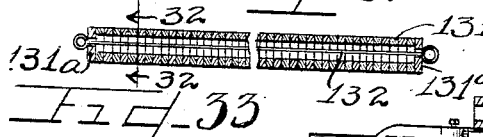 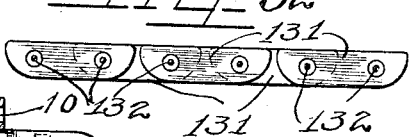
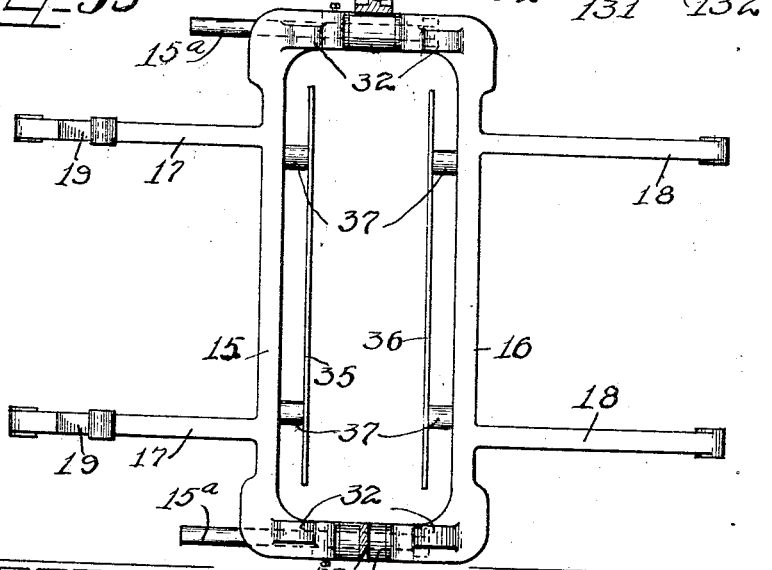
Witnesses
J.W. Angell
Charles W. Hill
Inventors
Chester T. Drake
John L. Needham
by Charles W. Hill Atty.

UNITED STATES PATENT OFFICE.

CHESTER T. DRAKE AND JOHN L. NEEDHAM, OF CHICAGO, ILLINOIS.

WRAPPING-MACHINE.

1,285,646.   Specification of Letters Patent.   Patented Nov. 26, 1918.

Application filed April 8, 1914. Serial No. 830,333.

*To all whom it may concern:*

Be it known that we, CHESTER T. DRAKE and JOHN L. NEEDHAM, citizens of the United States, and residents of the city of Chicago, in the county of Cook and State of Illinois, have invented certain new and useful Improvements in Wrapping-Machines; and we do hereby declare that the following is a full, clear, and exact description of the same, reference being had to the accompanying drawings, and to the numerals of reference marked thereon, which form a part of this specification.

Wrapping machines of a great number of different types have been constructed for the purpose of applying a wrapper to certain articles and the different characteristics of each of the wrapping machines have depended largely upon the article to be wrapped. However, great difficulty has been experienced in constructing a machine capable of applying a wrapper to a loaf of bread or other article which is necessarily of yielding nature and liable to damage unless great care is exercised in the form and construction of the parts which handle and contact the bread. The fact that the loaves are soft and yielding is not the only problem encountered for solution in constructing an efficient bread wrapping machine, for the loaves exhibit marked variations in shape and size even when baked at the same time and in pans of the same dimensions. Then too, different kinds of bread are generally made in loaves of different size and accordingly it becomes necessary to provide a machine the parts of which may be easily adjusted to readily receive and wrap loaves of any reasonable dimensions.

This invention relates to a wrapping machine, and in particular, one adapted to wrap a loaf of bread applying a paper wrapper thereon and serving to seal the same without damaging or materially deforming the loaf.

It is also an object of this invention to construct a wrapping machine wherein a wrapper is applied to an article by folding the wrapper over at the ends and sides on the top surface of the article in the proper sequence, permitting the article to be conveyed by mechanisms for the purpose to a sealing means and thereafter out of the machine in contact with yieldable mechanism holding the wrapper closely to the article and conforming to irregularities in the shape thereof until the seal has set.

It is also an object of this invention to construct a wrapping machine wherein the article to be wrapped is conveyed into position and placed upon a sheet of wrapping material and is thereafter forced under gentle pressure through a chute, the walls of which are shaped to fold the wrapper partly around the article, after which folding plates, actuated at the proper intervals of time, serve to fold the sides and ends of the wrapping over and upon the article, after which the wrapper is sealed and the article discharged from the machine.

It is also an object of this invention to construct a wrapping machine wherein an article to be wrapped is placed upon a sheet of wrapping material over a wrapping chute, after which it is forced gently therethrough by gravity acting mechanism and finally comes to rest upon a resilient plate which is forced downwardly an amount dependent upon the size of the article and positively held in such position, after which folding mechanisms act to complete the wrapping operation and then transfer the wrapped article to sealing devices.

It is also an object of this invention to construct a wrapping machine wherein a loaf to be wrapped is placed upon a sheet of wrapping material resting over a chute, the walls of which are adjustable to accommodate loaves of different size, and the loaf is then forced gently through the chute by gravity acting mechanism to a position where folding devices operated in proper sequence crease and fold the free portions of the wrapper upon the article, at the same time means acting to return the gravity acting mechanism to initial position, and further means acting then to convey the wrapped article from the folding devices for sealing.

It is furthermore an object of this invention to construct a wrapping machine wherein an article is transferred or conveyed into a position for wrapping by yieldably mounted means and after which it is passed through a wrapping chute under the gentle pressure of a gravity acting mechanism to be received upon a yieldable support which adapts itself in height to the particular size of the article received thereon and is held in such position by positive interlocking means and with folding and sealing means then acting to complete the operation of applying the wrapper to the article.

It is finally an object of this invention to construct a wrapping machine in which such articles as bread may have a wrapper applied thereto by mechanisms yieldably mounted to handle the article gently at all times, insuring the close application of a wrapper completely and effectually sealed thereon.

The invention (in a preferred form) is illustrated in the drawings and hereinafter more fully described.

In the drawings:

Figure 1 is a top plan view partly broken away of a wrapping machine embodying the principles of our invention.

Fig. 2 is an end elevation thereof, looking toward the feeding means, and with parts broken away.

Fig. 3 is a sectional view with parts in elevation, taken on line 3—3 of Fig. 2.

Fig. 4 is a fragmentary detail view of the upper portion of the machine with parts in section, taken on line 4—4 of Fig. 1.

Fig. 5 is a fragmentary enlarged front elevation of the wrapping machine.

Fig. 6 is a fragmentary detail view partly in section and partly in elevation, taken on line 6—6 of Fig. 3.

Fig. 7 is a fragmentary sectional detail with parts in elevation, taken on line 7—7 of Fig. 3, and with parts omitted.

Fig. 8 is a fragmentary rear elevation of the lower portion of the machine.

Fig. 9 is a somewhat similar sectional view, taken on line 9—9 of Fig. 3.

Fig. 10 is a sectional detail with parts in elevation, taken on line 10—10 of Fig. 2.

Fig. 11 is a fragmentary elevation, showing in detail the driving connection of the members shown in the lower portion of Fig. 8.

Fig. 12 is a fragmentary detail section taken on line 12—12 of Fig. 2.

Fig. 13 is a detail section on line 13—13 of Fig. 8.

Fig. 14 is a similar section with the parts in release position.

Fig. 15 is a fragmentary detail section taken on line 15—15 of Fig. 1, showing the pintle mounting for the upper pan or plate supports for the article to be wrapped.

Fig. 16 is a fragmentary section showing the parts illustrated in Fig. 15 in plan form, and taken on line 16—16 of Fig. 2.

Fig. 17 is a fragmentary sectional detail taken on line 17—17 of Fig. 5.

Fig. 18 is a fragmentary detail sectional view taken on line 18—18 of Fig. 1.

Fig. 19 is an interior elevation of the parts shown in Fig. 18.

Fig. 20 is a diagrammatic view illustrating an article in initial position at the top of the wrapping chute.

Fig. 21 is a similar view showing the position of the wrapping material upon the article as the article is moved downwardly through the chute.

Fig. 22 is a similar view showing an end flap of the wrapping material being folded over.

Fig. 23 is a similar view of the further progress of the article, showing the opposite end flap being folded over.

Fig. 24 is a fragmentary front elevation of a machine with parts broken away, showing the article after its passage through the chute, with the end flaps of the wrapping material folded over the ends and with the free portions of the wrapping material extending upwardly into the chute.

Fig. 25 is a fragmentary plan view of the folding means acting to fold the folded end flaps over the top surface of the article after the horizontal folder plate has first folded one of the side portions of the wrapping material.

Fig. 26 is a fragmentary front elevation of the machine with parts broken away illustrating the article moved to sealing position with the wrapper completely folded thereon.

Fig. 27 is a perspective view of the article with the sealed wrapper applied thereon.

Fig. 28 is a fragmentary detail of the upper end of the machine, illustrating the automatic release for the gravity acting mechanism, which thrusts the article to be wrapped into wrapping position.

Fig. 29 is a detail of the mechanism for retaining the resilient supporting plate in depressed position.

Fig. 30 is an enlarged fragmentary detail plan view of the link belt.

Fig. 31 is a section on line 31—31 of Fig. 30.

Fig. 32 is a fragmentary section on line 32—32 of Fig. 31.

Fig. 33 is a fragmentary section on line 33—33 of Fig. 5, with parts omitted.

As shown in the drawings:

The mechanisms of the machine are supported upon end A-frames 1 and 2, respectively, which are joined at their upper ends to one another by means of horizontally disposed H-frames 3 and 4, of which the H-frame 3, is connected to the end A-frame 1, by means of bolts 5, and the corresponding H-frame 4, is connected to the end A-frame 2, by means of bolts 6. As clearly shown in Figs. 2, 5, and 10, said respective H-frames 3 and 4, are rigidly bolted to one another by means of bolts 7 and 8, respectively, with an arm 9, held rigidly in upright position therebetween by means of said bolts 7, and similarly with another longer upright arm 10, held rigidly in upright position by means of said bolts 8.

Integrally formed on the upper horizontal extension of the A-frame 1, are bracket arms 11, which serve to support discharge guides for the articles, as hereinafter described. Similarly formed upon the upper horizontal extension of the A-frame 2, are a pair of upstanding bracket arms 12, and a central supporting arm 13, therebetween, the latter of which is in horizontal alinement with an upright bracket arm 14, formed on the H-frame member 4. Bolted to the upper end of the upright supporting arm 9, and to the intermediate portion of the upright bracket arm 10, are transversely extending bracket members 15 and 16, respectively, disposed horizontally and in parallel relation to one another, and of which the member 15, is adjustable to and from the fixed member 16, on the extended bolts or rods 15$^a$, at the front and rear sides of the machine respectively. Integral with the bracket member 15, and extending longitudinally of the machine are outstanding supporting arms 17, and similarly integral arms 18, extend outwardly and longitudinally from said bracket member 16, symmetrically disposed with respect to said arms 17. Each of the bracket arms 17, has an integral upstanding lug or extension 19, through which is passed a pintle bolt 20, affording a pivotal support for brackets 21, on which a feeding frame 22, is rigidly connected and thus hingedly supported.

Rods 23, are slidably mounted in extensions 24, on said frame members 22, and wound about said rods and disposed between collars 25, rigidly secured thereon, and between one of the extending portions 24, are spiral compression springs 26.

Secured on the outer end of each of said pairs of rods 23, are follower plates 27, so that an article, such as a loaf of bread X, guided between the frame members 22, on a conveyer belt 28, trained about a roll 29, mounted in the outer end of said arms 17, is thrust along on a pair of stationary plates 30, mounted on and between said brackets 21. Due to the oncoming successive loaves in said frame 22, the first loaf X, is thrust outwardly against said follower plates 27, the rods 23, sliding outwardly against the compression of the springs 26, and serving to hold the loaf until the limit of movement is reached. Hingedly supported upon a pintle bolt 31, extending through upstanding lugs 32, formed on said transverse members 15 and 16, are flat pans or plates 33 and 34, respectively, mounted opposite one another and with the inner ends thereof arching away from one another and also curving downwardly into register with side walls 35 and 36, respectively of a chute, as clearly shown in Fig. 15.

As illustrated in the above mentioned figure, said chute walls 35 and 36, are rigidly held in position on lug extensions 37, formed on said respective transverse supporting members 15 and 16. Rigidly secured to each of said respective pans 33 and 34, are arms 38 and 39, which extend through a vertical slot in the upright bracket arm 10, at the rear of the machine, and the arm 38, is folded over, as indicated at 40, to loosely engage the arm 39, such that when said arm 39, is unsupported, the arms will each swing down by gravity with a corresponding and simultaneous upward tilting of each of said plates 33 and 34, to facilitate discharge into the chute of an article supported over the top thereof.

As clearly shown in Fig. 4, the upper end of the arm 10, is curved inwardly and forwardly over the machine, and slidably mounted therein to move vertically therethrough are rods 41 and 42, which, at their lower ends have secured thereon a rounded presser plate 43, and at the upper end of said rod 41, is secured a weight 44, which normally acts when said rods are released to move the same downwardly by gravity. For the purpose of holding said rods in elevated position and to permit an automatic release thereof when a loaf of bread is inserted beneath the rounded presser plate 43, a latching plate 45, is pivotally mounted upon the upper extension of said arm 10, as clearly shown in Fig. 28. This plate is normally held in latching position by means of a tension spring 46, and is adapted to engage beneath the presser plate 43, to hold the same and said rods elevated or retracted.

Prior to the downward movement of the loaf from the feeding mechanism, a sheet of wrapping material is placed over the chute by an operator, or of course suitable mechanism may be provided for the purpose. For the convenience of the operator when the wrapping material is manually placed in position, a tray 47, is supported upon the outwardly extending arms 18, at one side of the machine opposite the feeding mechanism to carry a supply of wrapping material.

Horizontal supporting pans or plates 48 and 49, respectively, are mounted in the same plane with, and between said plates 33 and 34, and have integral downwardly extending walls, which form a part of the chute. As clearly shown in Fig. 4, each of said pans 48 and 49, is adjustably mounted by means of screws 51, passing through a slotted vertical extension 52, on the under surface of each pan, and engaging in inwardly directed extensions 53 and 54, on said upright arms 9 and 10, respectively.

Triangularly shaped end folder plates 55 and 56, respectively, are adjustably secured to said respective plates 35 and 36, by means of adjusting screws 57, engaging in slots in said respective plates 35 and 36. It is apparent therefore, as clearly shown in Figs. 20 to 23 inclusive, that a loaf of bread X, passing downwardly through the chute has the paper folded around the bottom and upwardly along all four sides thereof, and at the ends the paper is first folded or creased over by means of the plate 55, and secondly by the plate 56. When the bread emerges from the lower end of the chute it rests upon a resilient supporting plate 58, between adjustable end plates 9a and 10a, respectively, with the unfolded portions of the wrapper extending upwardly into the chute.

It now becomes necessary to fold said extending portions of the wrapper downwardly upon the top surface of the article and then move or discharge the same. Of course, before any of the folding mechanisms can operate it is necessary that the presser plate 43, which has moved the loaf downwardly through the chute, be retracted. For this purpose a driving mechanism with cams associated therewith, is provided to effect the proper sequence of movement for retracting the presser plate 43, operating the folding and creasing mechanism, and transferring the wrapped loaf to one side.

A shaft 59, is journaled in the A-frame 2, and freely rotatable upon one end thereof is a belt pulley 60, to which is rigidly bolted a ratchet wheel 61. Rigidly secured upon the inner end of the shaft is a disk 62, having a diametrical slot 63, therein. Means for connecting up the drive or causing said pulley and ratchet wheel 61, to cause rotation of the shaft 59, are provided, and consist of an arm 64, keyed upon the shaft 59, and provided with a curved extension 65. Pivotally mounted on said curved extension 65, is a spring pressed pawl 66, provided with a pin 67, which, when the pawl is in retracted position, is adapted to move rearwardly into a slot 68, formed in said curved extension 65. A shaft 69, is journaled longitudinally of the machine, between the respective A-frames 1 and 2, and is adapted to receive the drive from said eccentric disk 62, by means of a connecting rod 70, at one end pivotally mounted upon an adjustable T-bolt 71, engaged in the slot 63, of said disk, and at its other end pivotally connected to a crank 72, which is keyed upon said shaft 69.

Another short cross shaft 73, is journaled in depending lugs on the H-frame 4, at right angles to and slightly above said shaft 69, and a drive is communicated from said shaft 69, to said shaft 73. For this purpose an angled beveled cam segment 74, is rigidly secured upon said shaft 69, and extending outwardly and integral therewith is a right angled arm 75, the extremity of which is rounded. Rigidly secured upon said cross shaft 73, is an arm 76, having a roller 77, on the end thereof, positioned in the path of the extremity of said arm 75, such that when the shaft 69, is rotated, after the cam 74 and arm 75, have moved a certain amount, the extremity of said arm 75, contacts said roller 77, rotating the arm 76, and consequently the shaft 73, therewith. Mechanism is provided for elevating the presser plate 43, forming a part of the gravity acting means, immediately upon rotation of said shaft 69, so that said presser plate may be withdrawn from the loaf supported upon the resilient plate 58, prior to the operation of the folding mechanism.

For this purpose a relatively long lever 78, is pivoted upon an extension 79, integral with said upright 10, and a link 80, at one of its ends is pivotally connected to the free extremity of said lever 78, and at its other end is pivoted to said presser plate 43. An actuating lever 81, is pivoted at its upper end to said lever 78, and at its lower end to a curved arm 82, which, at its inner end, is pivoted upon a stationary pintle shaft 83, extending centrally between the H-frames 3 and 4, directly above and parallel to said shaft 69. Mounted centrally on said shaft 69, is another cam 84, which co-acts with a roller 85, pivoted upon said curved arm 82, to elevate the arm when said cam 84, is moved by rotation of said shaft 69. Of course, when said curved arm 82, is elevated a corresponding movement of the lever 78, takes place, due to the connecting lever 81, between the curved arm and said lever 78, and accordingly the gravity acting mechanism, due to said upward movement of the lever 78, is elevated until the presser plate 43, is moved upwardly beyond the latch 45, permitting the same to engage therebeneath and hold said gravity acting mechanism retracted. We desire to particularly point out at this time that the preliminary folding operations and passage of the loaf through the chutes are performed by a lowering of the gravity acting mechanism, during which all of the driving means are at rest, and only come into action when the loaf has reached its limit of movement and is supported upon the resilient plate 58. At this time a pin 86, on the lower end of said lever 81, bears downwardly in the notched end of a lever 87, which is pivoted at the rear of the A-frame member 2, and has pivoted on its other end a link 88, the lower end of which is pivoted to a short lever 89, rigidly secured on a short shaft 90, journaled on the rear of said A-frame 2, as clearly shown in Fig. 8. A spring 91, connected to said short lever 89, acts to normally hold the same downwardly.

Rigidly secured upon the inner end of said rotatable shaft 90, is an upright arm 92, provided with an inclined head 93, which normally engages beneath the pin 67, on said pawl 66, to hold said pawl retracted out of engagement with said ratchet wheel 61. As said shaft 69, rotates, the cam 74, is moved, and it is due to the movement of said cam 74, that the folding and creasing mechanisms are operated. For this purpose a lever 94, is freely journaled upon said cross shaft 73, and at its lower end is provided with an extension having a roller 95, journaled thereon, which tracks on the bevel surface of said cam 74, so that as said cam 74, rotates said lever 94, is rotated a slight amount.

Slidably mounted in the arms 13 and 14, are horizontal rods 96, which, at their forward ends, are connected by a discharge foot or push plate 97. Slidably mounted upon the upper end of said rods 96, is an H-shaped carriage 98, on the outer end of which is rigidly secured a folder plate 100, adapted to move across the top surface of a loaf on said plate 58, beneath the chute. A link 101, connects the lever 94, with the outer lower end of said carriage 98, so that when said lever 94, is rotated by said cam 74, said carriage is moved forwardly, causing the folder plate 100, to sweep across the upper surface of the loaf, folding one side of the paper thereon. Immediately after such movement of said plate 100, the rollers 99, cause the end folder wings 102, to swing inwardly toward one another over the top surface of the loaf to fold the end of the paper thereon, due to the engagement of said rollers 99, with the inclined ends 103, of said wing plates, said wing plates being pivotally mounted upon the upper end of the standards 12, and limited in their movement by the pins 104, on the folder plate. For the purpose of retracting said wing plates when the H-carriage 98, is moved rearwardly, the rollers 104ª, on the inner end of said carriage, contact the inclined edges of said wing plates and serve to swing the same outwardly from beneath the chute.

The above operations having taken place, due to the movement of the cam 74, the arm 75, at the extremity of said cam now strikes the roller 77, on the crank 76, which is keyed upon said cross shaft 73, causing said shaft 73, to rotate. Rigidly secured upon said shaft 73, to move therewith, are levers 105 and 106. The purpose of the lever 105, is to actuate the discharge foot or push plate 97, and for this purpose said lever 105, is connected to said push plate by means of a link 107.

Pivotally connected to the upper end of the crank or lever 106, on said shaft 73, is a relatively long rack bar 108, the extremity of which rides upon rollers 109, supported in a bracket 110, mounted on the outer end of the shaft supporting said conveyer roll 29. Freely rotatable upon said conveyer roll shaft, is a gear 111, which meshes with said rack bar 108. A disk 112, is rotatably mounted upon said shaft with the hub of said disk contacting said gear, and wound about said hub and connected thereto is a spiral spring 113, the other end of which is connected to a pin 114, on the inner face of said gear 111. A lug 115, is formed on the outer periphery of the disk 112, adapted to contact said pin 114, when the gear 111, is reversely rotated. However, when the gear is rotated in a forward direction the drive is transmitted to the disk 112, through the spring 113. A pawl 116, is pivoted on said disk and normally impelled by a leaf spring 117, toward a ratchet wheel 118, which is keyed upon the shaft.

As shown in Fig. 5, and in detail in Fig. 29, the outer end of the resilient supporting plate 58, is provided with an upright pivoted spring impelled ratchet bar 119, and the discharge foot 97, is provided with an inturned tooth 120, which, when said foot is in retracted position, engages over the teeth in said ratchet bar 119, as the plate 58, is depressed by a loaf coming in contact therewith thrust downwardly by the gravity acting mechanism. The discharge foot, which moves the loaf, serves at the same instant to disengage the tooth 120, from the ratchet bar 119, thus releasing the resilient supporting plate 58, which acts to impel the loaf upwardly. Such resilient supporting plate 58, is secured upon a bracket 121, fastened upon the outer side of the end frame 1. Horizontal guide members 122, extend longitudinally of the machine and are rigidly secured upon the uprights 11, on the A-frame 1, adapting the bread received upon the resilient supporting plate 58, to move along said plate with the end of the loaf resting against said guide members.

When the loaf of bread has been thrust from beneath the chute and along the resilient supporting plate 58, by said discharge foot 97, it passes into the position illustrated in Fig. 26, where the wrapper is submitted to the heat of a plurality of electric heaters, one extending along the upper surface of the loaf and denoted by the reference numeral 123, and the others denoted by the reference numeral 124, one each mounted upon said guides 122, to seal the ends of the wrapper by causing a melting of the paraffin or other substance with which the wrapper is impregnated. As clearly shown in Figs. 5 and 26, said upper heating plate 123, is supported upon a relatively long link 125, and a link 126, connects the same in a slotted bracket 127. A relatively wide link belt 128, is connected to the other end of said relatively long link 125, and is supported at its other end in any suitable manner, but is adapted to rest upon a loaf passed outwardly from beneath the heating plate 123.

The flexibility of said belt permits it to contact the surface of the loaf pressing the wrapper firmly, but gently, thereon at all portions and thus holding the wrapper closely thereto until the seal has set.

The link belt 128, is especially constructed to obtain a very flexible and yielding mechanism, which, due to its weight, clings closely and evenly over the surface of the wrapped article pressing the wrapper firmly but gently thereto and yet offering only slight resistance to the movement of articles. Accordingly we have found that by using a number of small intermediate links 131, provided with large slots having flexible wires 132, inserted therethrough and relatively long links 131ª, extending along each edge of the belt, that an extremely satisfactory construction is secured.

The operation is as follows:

The loaf or article to be wrapped is introduced upon the conveyer belt 28, between the guide members 22, and is carried along thereby and discharged upon the supporting plates 30, from which it is thrust outwardly by successive oncoming loaves, due to the intermittently driven conveying mechanism, and by such movement causing the follower plates 27, to move therewith, said plates also serving to aid in the support of the article or loaf in midair during such movement. One of the follower plates 27, in its outward movement strikes the latch member 45, thus releasing the gravity acting mechanism, of which the presser plate 43, forms a part, and which at this time is disposed above the loaf, and said presser plate 43, descending upon the loaf, impels the same downwardly and gently out of contact with its supporting means.

A sheet of wrapping material is taken from the tray 47, by the operator, or otherwise disposed over the surface formed by the plates 33, 34, and 48 and 49, and the loaf descends thereupon with the continuous downward movement of the gravity acting mechanism. The curvature of the plates 33 and 34, serves to spring the wrapping material inwardly toward the loaf only at the middle portions of its sides, whereas at the ends of the loaf the wrapper is folded upwardly over practically the entire surface. This causes the corner portions of the wrapper to warp inwardly over the ends to greatly facilitate subsequent operations in folding the same. As the loaf is thrust into the chute formed by the plates 35, 36, and the aforementioned end plates 48 and 49, the wrapper is folded upwardly around the sides and ends of the loaf, as clearly shown in Figs. 20 to 23 inclusive. As the loaf continues in its descent one pair of the corner doubled portions of the wrapping material are first folded inwardly by the triangular plate 55, and secondly the other pair or opposite corners of the wrapping material are folded inwardly over said first portion, as clearly shown in Fig. 23. Thus the loaf is finally passed through the chute and down upon a resilient supporting plate 58, with the wrapping material at the ends of the loaf creased and folded, and, together with the side portions, projecting upwardly into the chute.

The resilient supporting plate 58, is provided with the ratchet mechanism 119, which co-acts with the tooth on the discharge foot 97, to hold the plate in its lower limit of movement as it is thrust downwardly by said loaf and gravity acting mechanism, so that when the gravity acting mechanism is retracted, said plate cannot spring upwardly until properly released. Up to this point all the folding operations have been performed by gravity and the driving means for the machine has been running free. However, owing to the fact that the long lever 81, is connected to the gravity acting mechanism the descent of said lever 81, simultaneously with the gravity acting mechanism, causes the pin 86, on the lower end of said lever to bear upon the notched end of the lever 87, pivoted on the rear of the A-frame member 2, and limited in its movement in one direction by a pin 130, on said frame, said lever then actuating through a link 88, the controlling mechanism for the drive. This consists of a pawl and ratchet mechanism, of which the pawl 66, is normally held out of engagement with the ratchet wheel 61, by a lever 92, the upper head 93, of which is inclined and engages beneath said pawl. The movement of the lever 88, the lower end of which is connected to the crank 89, causes rotation of the shaft 90, on which said lever 89, is rigidly secured, which in turn rotates said lever 92, thus moving said lever 92, out of engagement with the pin on the pawl, permitting the pawl to drop into engagement with the ratchet wheel 61. Inasmuch as the pawl is mounted upon the lever 64, which is rigidly connected upon the shaft 59, said lever proceeds to rotate around with the ratchet wheel, causing the shaft 59, and consequently the driving eccentric disk 62, which is keyed upon the inner end of said shaft, to rotate therewith. The shaft 69, is thereupon partly rotated by the connecting rod 70, which is pivoted upon said disk and connected to a crank 72, on said shaft 69, and immediately mechanism is brought into play to elevate said gravity acting mechanism.

This consists of the cam 84, on said shaft 69, which bears against the roller 85, on the curved arm 82, pivoted on the stationary shaft 83, at one of its ends and at its other end upon said lever 81, so that said lever 81, is positively elevated, thus elevating the long lever 78, and lifting the gravity acting mechanism back into initial position, in which it is held by the latch 45. As said shaft 69, rotates the cam 74, thereon, bears against the roller 95, on the lower end of the crank 94, pivotally mounted upon the small cross shaft 73, thus causing actuation of said lever 94. This lever 94, serves to actuate a folder plate 100, through a link 101, which is connected to the carriage 98, supporting said folder plate. The folder plate is projected across the top surface from one side of the loaf, thus folding one side of the wrapper downwardly thereon, and immediately thereafter rollers 99, on said carriage 98, engage behind the ends 103, of the wing plates 102, causing the same to swing inwardly toward one another and over the top surface of the loaf, folding the upwardly extending end wrapper portions downwardly thereon.

This much of the operation having been performed the arm or lever 75, integral with said cam 74, has now reached a position to strike the roller 77, on the crank 76, and the crank 76, being rigidly keyed upon the shaft 73, both the levers 105 and 106, which are keyed upon said cross shaft 73, are actuated. The lever 105, serves to thrust the discharge foot 97, which is rigidly mounted upon the ends of the rods 95 and 96, which are slidable through the supports 13 and 14, against the loaf to push the same forwardly and along said resilient supporting plate 58, and of course the moment said discharge foot 97, is moved, the latching means holding said plate 58, is released, and by the upward and horizontal movement of the loaf, the remaining side portion of the wrapping material is folded downwardly, due to contact with the lower end of said plate 33, forming a part of the chute. Said discharge foot 97, moves the loaf into a position between the heating plates 124, on the guides 122, and beneath the top heating plate 123, which serve to melt the paraffin or other substance with which the paper is impregnated. The loaf subsequently moves outwardly beneath the flexible link belt 128, which bears downwardly and evenly thereon, conforming to all the irregularities thereof, and causing the wrapper to adhere at all points until the sealing substance has set.

The other lever 106, serves to actuate the conveying mechanism first referred to, which feeds the loaf beneath the gravity acting means. This, of course, is an intermittently acting mechanism, inasmuch as the drive is only connected up when the lever 81, descends to the particular point already referred to. This lever 106, serves to actuate the rack bar 108, which co-acts with the gear 111, mounted on the conveyer roller shaft in the bracket arms 17. Said gear 111, drives the conveyer roller 29, through the spring 113, and pawl and ratchet wheel, so that the loaves are fed forward yieldably. Of course, the retractive movement of the bar 108, causes the pawl 116, of said pawl and ratchet mechanism to merely track over the ratchet wheel without causing a reverse rotation of the conveyer roll 29, and the same is accordingly at rest until the driving mechanism is again brought into operation by the complete lowering movement of the gravity acting mechanism. The purpose of mounting the top plates 33 and 34, pivotally, as clearly shown in Figs. 15 and 16, is to permit an upwardly directed lug 129, on said lever 81, which normally supports the arm 39, of said plate 34, which in turn supports the arm 38, of the plate 33, to release said plates, permitting the same to tilt toward one another by gravity and center the load directly over the chute when said lug moves downwardly and away from the arm 39. Of course, after the follower plates 27, have been projected outwardly by a loaf and the loaf has been removed therefrom by the gravity acting mechanism said follower plates are returned by the compression springs 26, which are coiled around the rods 23, of the feeding mechanism. It is noteworthy that in this particular machine the drive is not connected up until the gravity acting mechanism has lowered the loaf through the chute, which performs a considerable part of the folding operation. The drive is then automatically thrown on and the cams are so disposed and constructed that the proper sequence of operations takes place in folding the side and end portions of the wrapper upon the top surface of the loaf, and finally discharging the same to the heating plates for sealing. Of course, the drive serves also to cause elevation of the gravity acting mechanism and the drive automatically disengages itself, owing to the fact that immediately upon the rising of the gravity acting mechanism the lever 92, at the bottom of the A-frame 2, springs back into position, so that said pin 67, carried on said pawl 66, as it rotates around with said ratchet wheel 61, strikes the upper inclined head 93, of the lever 92, thus retracting the pawl and disengaging the drive.

This machine is capable of wrapping loaves which vary considerably in shape and size without mechanical adjustment of the parts. However, when it is desired to make mechanical adjustments for different size loaves the entire feeding mechanism and the curved supporting pan or plate 33, can be adjusted with said bracket 15, on the rods 15ª. As already pointed out, the end plates which form a part of the chute are also adjustable toward and away from one another so that loaves of different lengths can be readily handled. Of course, the resiliency of the supporting plate 58, and the latching mechanism therefor, takes care of the variations in thickness of the loaves.

We are aware that various details of construction may be varied through a wide range without departing from the principles of this invention. We therefore do not purpose limiting the patent granted otherwise than necessitated by the prior art.

We claim as our invention:

1. In a wrapping machine, feeding mechanism for articles to be wrapped, gravity acting means to remove the article therefrom to pass the article through the machine, a plurality of folding devices to fold a wrapper around the article during its passage through the machine, certain of said folder devices movable to perform a folding operation, a discharge mechanism to discharge the wrapped article, and a drive for said movable folder devices and said discharge means adapted to be brought into operation by movement of said removing means.

2. In a device of the class described feeding mechanism, a chute adapted to receive an article therefrom with a sheet of wrapping material therebeneath, gravity acting means moving the article downwardly through the chute unsupported from beneath to properly fold said wrapping material thereon, linearly movable and pivotally movable mechanisms at the bottom of the chute for completing the folding operation, means discharging the wrapped article, and driving mechanism operably connected with said folding mechanisms, and discharge means adapted to be set in operation by said means which moves the article downwardly.

3. In a device of the class described intermittently driven feeding mechanism, a chute adapted to receive an article from said feeding mechanism with a sheet of wrapping material disposed therebeneath, mechanism operating gravitationally to move said article through the chute unsupported from beneath, acting to partly fold the wrapping material therearound, means withdrawing said latter mechanism when the article has passed through the chute, folding members operating over the upper surface of the article to complete the folding operation, and mechanism discharging the wrapped article.

4. In a device of the class described a chute adapted to receive an article with a sheet of wrapping material disposed therebeneath, gravitational means moving said article through the chute to partially fold the wrapper therearound, means forming a part of said chute acting to fold the corner portions of the wrapper over the ends of the article in successive order, and mechanism acting over the surface of said article after the same leaves said chute to complete the folding of the wrapper on the article.

5. In a device of the class described a chute adapted to receive an article to be wrapped with a sheet of wrapping material disposed therebeneath, weighted means moving the article through said chute causing the wrapper to be folded upwardly on four sides of the article, folding plates forming a part of said chute to fold the corners of said wrapping material over the ends of the article, in successive order linearly and pivotally movable co-acting mechanisms acting to fold said folded portions to complete the wrapping operation after the article has passed through said chute, and driving mechanism operatably connected with said folding mechanisms and set in operation by said article moving means after a predetermined movement thereof.

6. In a device of the class described feeding mechanism, a chute to receive an article from said feeding mechanism with a sheet of wrapping material interposed between the article and said chute, centering mechanism for disposing the article directly over said chute on said wrapping material, mechanism moving the article and wrapper unsupported from beneath, downwardly through said chute to partially fold the wrapper therearound, means acting to complete the folding operations on said wrapper after the article has left said chute, sealing means for the wrapper, and mechanism acting to move the article after the completion of the folding operations to said sealing means.

7. In a device of the class described means intermittently feeding articles to be wrapped, mechanism automatically released thereby to move the article from said means, a chute to receive the article from said feeding means, said mechanism adapted to move the article through said chute to apply a sheet of wrapping material therearound, an adjustable support receiving the article after discharge from said chute, folding mechanism acting on the wrapper after the article has left the chute and is on said support, and means acting intermittently to discharge the wrapped article.

8. In a device of the class described feeding means, folder devices, mechanism directly released by said feeding means acting to remove an article therefrom and pass the same to said folder devices, and a drive connected up by movement of said mechanism to operate said folder devices to wrap the article and discharge the same.

9. In a device of the class described a stationary folder chute adapted to receive an article with a sheet of wrapping material therethrough to fold said material about the article, a weighted gravitationally acting mechanism thrusting the article through the chute, resilient means supporting the article after discharge from said chute, mechanism operating beneath the lower end of said chute and over the surface of the article to complete the folding operation on said wrapping material while the article is on said support, and a drive for said mechanism set in operation by movement of said thrusting mechanism.

10. In a device of the class described feeding mechanism for articles to be wrapped, a chute adapted to receive the articles thrust therethrough unsupported from beneath and associated with a sheet of wrapping material, said chute adapted to dispose the sheet about the article, gravity acting means moving the article through the chute, and means completing the folding operations after the article has been discharged from the chute.

11. In a device of the class described intermittently driven feeding mechanism, a chute, gravity acting means acting to move an article from said feeding mechanism to said chute, means centering the article on a sheet of wrapping material over said chute, said chute acting to partly fold the material around the article as the article passes through the chute, resilient means supporting the article after discharge from the chute, folding mechanisms acting over the top surface of the article, and intermittently driven discharge mechanism for discharging the wrapped article.

12. In a machine of the class described a chute adapted to receive an article on a sheet of wrapping material, gravity acting means to pass the article through said chute to partly apply the wrapper, resilient means to receive the article after discharge from said chute, a drive for the machine, mechanism connected with said gravity acting means to connect up said drive to return said gravity acting means to initial position, folding mechanisms operated in proper sequence by said drive, and mechanism operated by said drive to discharge the wrapped article.

13. In a device of the class described feeding means for articles to be wrapped, a folder chute to receive an article and a sheet of wrapping material, gravity acting means to move the article through said chute to partly fold the wrapping material around the article, resilient means to receive the article after discharge from said chute, constantly driven driving mechanism, means connected to said gravity acting means to connect up the driving mechanism to return said gravity acting means to initial position, folding devices operated by said drive in proper sequence to further the folding operations on said wrapper, mechanism for discharging and completing the wrapping of the article, and means automatically disengaging the drive after the return of the parts to normal.

14. In a machine of the class described feeding mechanism for articles to be wrapped, means adapted to receive an article with a sheet of wrapping material to partly apply the same around the article, mechanism moving said article to and through said receiving means, a drive for said machine, members operated by said mechanism to connect up said drive to return said mechanism to normal position, connections between said feeding mechanism and said drive to operate the feeding mechanism, folding devices operated by said drive to complete the folding operations and discharge said article, and mechanism automatically disengaging the drive after discharge of the article.

15. In a device of the class described a feed conveying means, a yielding drive therefor, folding devices to receive an article from said means, mechanism passing the article from the feeding means to said folding devices, a drive, said mechanism acting to connect the drive with said feeding means, with said folding devices, and with said mechanism, and allowing the drive to return said mechanism to normal position, and mechanism operated from said drive to discharge the wrapped article from said folding devices.

16. In a device of the class described, feeding means, folding devices to receive an article therefrom to apply a wrapper, weighted means adapted to engage the article from above to move the article from said feeding means through the folding devices, and a drive for said mechanism and devices set into operation by said weighted means.

17. In a device of the class described intermittently driven feeding mechanism, stationary and movable folding devices, gravitationally acting means passing an article from said feeding mechanism into the field of said folding devices, and an intermittently driven member to discharge the wrapped article from the folding devices.

18. In a device of the class described feeding mechanism, folding devices to receive an article therefrom to apply a wrapper, means moving the article from said feeding mechanism to the folding devices, and a drive for said mechanism and devices set into operation by said means.

19. In a device of the class described feeding mechanism, folding devices to apply a wrapper on an article received from said feeding mechanism, gravity acting mechanism moving the article from the feeding mechanism to said folding devices, a drive, a plurality of cams forming a part thereof, one acting to return said moving mechanism to normal, and another acting to actuate said folding devices, and discharge mechanism driven by said drive to remove a wrapped article.

20. In a device of the class described a frame, a folder chute mounted thereon, an intermittently driven hingedly mounted and yieldable feeding mechanism to feed articles to be wrapped over said chute, mechanism acting to move an article from the feeding mechanism into said chute to partially apply a wrapper therearound, an adjustable support to receive the article discharged from the chute, means holding said support in adjusted position dependent upon the size of the article, folding means acting to further the wrapping operation, and mechanism to complete the folding operation and eject the wrapped article.

21. In a device of the class described, a frame, a vertical wrapping chute, stationary and linearly and pivotally movable wrapping devices associated therewith, gravity acting mechanism passing an article to be wrapped through said chute unsupported from beneath and through the field of operation of said devices without rotation of the article, mechanism acting to discharge the article after it has been wrapped, and a drive for the movable wrapping devices and said latter mechanism adapted to be connected up by said first mentioned mechanism after a predetermined movement thereof.

22. In a wrapping machine a plurality of folding devices adapted to apply a wrapper on an article, certain of said devices stationary and others pivotally and slidably mounted, a gravitational mechanism passing the article downwardly with its wrapper unsupported from beneath through the field of operation of said devices without rotating the article, mechanism operating said folding devices in proper sequence to wrap the article, and a drive for said folding devices and said latter operating mechanism adapted to be connected up by said first mentioned mechanism.

23. In a wrapping machine of the class described feeding mechanism, an intermittent drive therefor, yieldable connections between said drive and the feeding mechanism, spring actuated extensible means to support an article to be wrapped as it is moved by said feeding mechanism toward wrapping position, gravity acting mechanism automatically released by said extensible means to move the article to be wrapped out of engagement with said means, a wrapping chute to receive the article and a sheet of wrapping material therethrough to partly fold said wrapping material around the article, folding devices acting on said wrapping material after the article leaves said chute, and an intermittently driven discharge means to move the article wrapped out of the field of operation of said folding devices.

24. In a device of the class described an intermittently driven linearly movable and yieldably acting feeding mechanism for articles to be wrapped, stationary and movable wrapping devices, mechanism moving the article downwardly unsupported from beneath from said feeding mechanism through the field of operation of said wrapping devices to permit a wrapper to be applied on the article, guide members, mechanism adapted to move the wrapped article to said guide members, and a drive for said latter mechanism connected up by movement of said second mentioned mechanism.

25. In a wrapping machine for applying a wrapper to an article, feeding mechanism for the articles, a plurality of folding devices, gravity acting means moving an article from said feeding mechanism through the field of operation of said folding devices, means passing the wrapped article from the folding devices toward discharge, and flexible yieldable means bearing uniformly on said article all during the discharge and conforming to the irregularities thereof to hold the wrapper closely thereto.

26. In a device of the class described mechanism for wrapping an article, gravity acting means for moving an article therethrough to wrap the same, and yieldable flexible mechanism adapted to cling around the article conforming to the irregularities thereof and holding the wrapper closely thereto.

27. In a device of the class described intermittently driven feeding mechanism, a plurality of wrapping devices to receive an article from said feeding mechanism to apply a wrapper thereon, intermittently driven discharge means to move the wrapped article from the field of operation of said devices, resilient mechanisms to receive the wrapped article, and flexible mechanism bearing yieldably upon and conforming to the surface of the article to hold the wrapper closely thereto.

28. In a device of the class described wrapping means to apply a wrapper on an article, discharge mechanisms, and flexible link belt mechanism pressing the wrapper closely to the article at all points as the article is discharged from the device by said discharge mechanism.

29. In a device of the class described means applying a wrapper on an article, guides to receive the wrapped article, and linked means adjustably mounted and of flexible nature to bear gravitationally on said article conforming thereto to press the wrapper closely on the article at all points.

30. In a device of the class described feeding mechanisms, a chute adapted to receive an article from said feeding mechanism to apply a wrapper therearound, folding devices acting on the wrapper after discharge of the article from said chute, a resilient adjustable support to receive the article from said chute, a discharge foot to eject the article after the operations of the folding devices, and co-acting mechanisms on said discharge foot and said support to hold said support downwardly in adjusted position with the article thereon.

31. In a device of the class described feeding mechanism for articles to be wrapped, a chute adapted to receive the articles to partly fold a wrapper therearound, movable means for passing an article from said feeding mechanism to said chute, members controlled by said means to center the article directly over said chute before passage therethrough, continuously driven driving mechanisms, connecting mechanism adapted to be operated by said moving means, a cam shaft adapted to be connected to said driving means by said connecting mechanism, a cam thereon acting to return said moving means to normal position, a cross shaft driven from said cam shaft, folding devices to operate on the wrapper on said article after discharge from said chute, a cam on said cam shaft for operating said folding devices, discharge mechanism operated from said cross shaft to discharge the wrapped article, and driving connections between said cross shaft and said feeding mechanism.

32. In a wrapping machine of the class described means for applying a wrapper on an article, a resilient adjustable support for the article acting to support the same during a part of the wrapping operation, discharge mechanism to move the article out of the field of operation of said wrapping means, and co-acting mechanism on said support and said discharge mechanism to hold said support in an adjusted position prior to discharge of the article and during the operation of the wrapping means.

33. In a wrapping machine of the class described intermittently operated feeding mechanism adapted to feed loaves one by one, a wrapping chute to receive the loaves from said feeding mechanism, gravity acting means to move the loaves from said feeding mechanism to the chute, folder devices at the bottom of said chute to operate on a wrapper on said loaves, means discharging the wrapped loaves from the field of operation of said folding devices, and mechanism bearing on said loaves conforming to the shape thereof and holding the wrappers closely thereto as the wrapped loaves are being discharged.

34. In a device of the class described feeding mechanism, wrapping devices to receive an article from said feeding mechanism to apply a wrapper thereto, discharge mechanism to discharge the wrapped article, gravity acting means to move the article from said feeding mechanism into the field of operation of said wrapping mechanisms, a drive for said feed and discharge and said folding mechanisms, and connecting elements operated by said gravity acting means to connect up the drive with said respective mechanisms.

35. In a device of the class described feeding mechanism, a chute adapted to receive articles to be wrapped from said feeding mechanism, means moving the articles from said feeding mechanisms to said chute, said chute adapted to apply a wrapper on all four sides of an article descending therethrough, a support to receive the article and wrapper discharged from the chute, folding devices acting over the top surface of the article to fold a side and the end portions of the wrapper on the article, discharge mechanism acting to move the article from the field of operation of said folding devices and by such movement completing the wrapping operation, guide means to receive the wrapped article, and means bearing closely upon the article over the wrapper to hold the wrapper evenly in place.

36. In a device of the class described feeding mechanism, a folder chute to receive an article to be wrapped from said feeding mechanism, means moving an article from said feeding mechanism to and through said chute, centering means controlled by said moving means to center the article to be wrapped over said chute, folding devices operating on the wrapper on the article after discharge from said chute, resilient adjustable supporting means supporting the article in position for operation by said folding devices after discharge from said chute, and discharge mechanism for discharging the article after the operation of said folding devices, said discharge mechanism co-acting with said supporting means to hold the same in an adjusted position.

37. In a wrapping machine of the class described feeding mechanism for the article to be wrapped, folding devices to receive the article from said feeding mechanism, said devices comprising in part pivotally mounted wing plates adapted to swing over the surface of the article to fold the wrapper thereon, a folder plate adapted to move over the surface of said article prior to the movement of said wing plates thereover, a carriage supporting said folder plate, and means on said carriage to operate said wing plates in proper sequence.

38. In a device of the class described feeding mechanism, a chute to receive the article discharged from said feeding mechanism to apply a wrapper partly therearound, supporting means for said article after movement through said chute, a movable carriage, a folder plate mounted thereon adapted to fold the wrapper on one side of said article, wing plates adapted to swing over the ends of the article on the top surface thereof to fold the wrapper downwardly thereon, mechanism on said carriage adapted to operate said wing plates, and discharge mechanism acting in proper sequence to move the article from beneath said wing plates and by such movement co-acting with the chute to complete the folding operations on the wrapper.

39. In a device of the class described a chute adapted to receive an article and a sheet of wrapping material therethrough to fold the wrapper over the bottom and upwardly on four sides of said article, plates mounted on said chute to crease the corner portions of the wrapper in folded position in successive order over the ends of the article, a slidable folder plate means acting on the wrapper after discharge of the article from the chute to fold one of the side portions thereof, pivoted wing plates movable toward one another to fold the upwardly extending end portions of said wrapper downwardly upon the surface of the article and actuated by said folder plate means, and discharge mechanism acting to move the article from beneath said chute and by such movement completing the wrapping operation.

40. In a device of the class described conveying mechanism, a chute to receive the article from said conveying mechanism to apply a wrapper partly therearound, a resilient adjustable support to receive the article discharged from said chute, folding devices operating on the article resting on said support to crease the wrapper upon the top surface of the article from three sides thereof, discharge mechanism to move the article from beneath the chute and by such movement completing the creasing operation of the wrapper, guide means to receive the wrapped article, and a flexible yieldable pressing means to hold the wrapper closely to the article as the article is moved through said guide means.

41. In a wrapping machine, a chute through which an article is to be wrapped, is passed, means thrusting the article through said chute, mechanism to fold the wrapping material inwardly, and warping the same centrally on the sides of the article, mechanism for folding the material substantially over the entire end surfaces of the article, thus warping the corner portions inwardly over the end, means acting to crease said corner portions in successive order over the ends of the article, and to fold the same and the side portions over the top thereof, and discharge mechanism set in operation to discharge the wrapped article by said means which thrusts the article through said chute.

42. In a machine of the class described, means centrally warping the wrapping material upwardly on two sides of an article, means to thrust the end portions of the material substantially over the entire end surfaces of the article to cause the corner portions to warp over the ends of the article, mechanism to crease said corner portions, one over the other, and pivotally mounted wing plates adapted to swing over the article to fold the end and side portions of the wrapper on the sides and over the top surface of the article.

43. In a device of the class described means for folding wrapping material upwardly simultaneously on four sides of an article, certain of said means curved to arch the wrapping material inwardly at only one point on the sides of the article and said other means folding the material closely over the end surfaces thereof causing the corner portions to warp inwardly over the ends of the article, and means for folding said corner portions and side and end portions over the surface of the article to completely wrap the same.

44. In a device of the class described plates spaced apart adapted to receive an article moved therebetween to apply a wrapper thereon, certain of said plates curved to arch the wrapping material inwardly to initially contact the article substantially at only one point on each side thereof, said curved plates adjustable toward and away from one another, and means creasing the corner portions of the wrapping material over the ends of the article.

45. In a device of the class described a plurality of mechanisms to apply a wrapper on an article, certain of said mechanisms curved and pivotally mounted to center the article for wrapping and arch the wrapper inwardly thereon substantially at the middle points on the sides thereof, and other of said mechanisms acting to fold the end portions and the corner portions of the wrapping material over and upon the article.

46. In a device of the class described, adjustable wrapping means, and gravity acting means adapted to pass downwardly therethrough to force a wrapper and an article unsupported from beneath through said means to apply the wrapper on the article during the movement of the article through said wrapping means.

47. In a device of the class described, means for applying a wrapper on an article, gravity acting means for forcing an article downwardly through the wrapping means to wrap the article, and a yieldable flexible link means adapted to cling over the surface of the wrapped article pressing the wrapper closely thereto until the wrapped article is discharged from the device.

48. In a device of the class described, adjustable wrapping means, gravity means for forcing an unsupported wrapper and an article through said means to wrap the wrapper around said article, and means for discharging the wrapped article from the device.

49. In a wrapping machine of the class described, a chute to receive articles, means for thrusting an article downwardly through said chute, said chute acting to fold corner portions of the wrapper over the ends of the article in successive order as the article passes therethrough, a plurality of pivotally mounted wing plates at the bottom of the chute for completing the folding operation, means for actuating said wing plates, and discharge mechanism set in operation due to completion of the movement of said means thrusting the article through the chute.

50. In a machine of the class described, a chute to receive articles passed therethrough to apply a wrapper thereon, mechanism for thrusting an article through said chute, folding devices at the bottom of the chute comprising pivotally mounted wing plates and a folder plate for completing the folding operation on the article, said wing plates and folder plate set in operation by said mechanism as it completes the movement of the article through the chute.

51. In a device of the class described a chute to receive an article with a sheet of wrapping material to apply the wrapping material on said article, gravity acting means moving the unsupported article through the chute to properly fold said wrapping material thereon, and mechanisms at the bottom of the chute for completing the folding operation.

52. In a device of the class described a chute adapted to receive an article with a sheet of wrapping material therethrough, gravity acting means for moving the article downwardly through said chute, means folding the wrapping material inwardly and centrally on the sides of the article, and with the corner portions overlapped to completely cover the ends thereof as the article passes through said chute, and means completing the folding operations on said wrapping material after the passage of the article through said chute.

53. In a device of the class described means applying a wrapper on an article, mechanism sealing the wrapper thereon, said means and mechanism adjustable for articles of different size, and a link belt element bearing gravitationally on a wrapped article to hold the wrapper closely thereto until the seal has set.

54. In a device of the class described a plurality of folding devices, certain ones thereof curved and adjustable and acting by movement of an article therepast to arch the wrapper inwardly at only one point on the sides thereof, the other devices acting to fold the wrapper over the ends of the article, thus warping the corner portions over the ends, means creasing said corner portions on the ends of the article, and mechanism to complete the folding operations on the wrapper of the article.

55. In a device of the class described stationary and movable folding devices, certain ones thereof curved and pivotally mounted to center an article and fold a wrapping material inwardly and centrally on the sides thereof, mechanism folding the wrapper over the ends of the article whereby the corner portions are warped inwardly over the ends thereof, mechanism acting to move the article, and means acting on the moving article to fold said corner portions on the ends thereof.

56. In a device of the class described folding devices to apply a wrapper on an article, gravitationally acting and power driven mechanisms moving the article through the field of operation of said folding devices, a drive, a plurality of cams forming a part thereof, one acting to return said moving mechanism to normal, and another acting to actuate said folding devices, and mechanism driven by the drive to remove the wrapped article.

57. In a device of the class described mechanism for folding a wrapper upwardly on four sides of an article in a manner to warp the corner portions over the ends of the article, means acting to crease said corner portions in successive order on the ends of the article and to fold the wrapper to complete the wrapping operation, and means operating to effect a movement of said article gravitationally through the field of operation of said mechanism and means.

58. In a device of the class described a plurality of wrapping devices to apply a wrapper on an article, means discharging the wrapped article from the field of operation of said devices, guide mechanisms for the wrapped article, and flexible link means bearing yieldably upon the article and pressing the wrapper closely thereto at all points until the wrapped article is discharged.

59. In a wrapping machine for applying a wrapper to an article, a plurality of folding devices to fold the wrapper thereon, means moving the article through the field of operation of said devices, sealing members, means passing the wrapped article from the folding devices to said sealing members, mechanism moving the article from said sealing members toward the discharge, and flexible yieldable means bearing uniformly on said article all during the discharge, and conforming to the irregularities thereof to hold the wrapper closely thereto until the seal has set.

60. In a device of the class described mechanism for wrapping an article comprising a plurality of plates, certain ones thereof curved and pivotally mounted to warp a wrapping material inwardly at substantially only one point on the sides of an article, the others thereof acting to fold a wrapping material over the ends of the article, means for creasing and completing the folding of the wrapper on the article, guide means for the wrapped article, and yieldable mechanism adapted to press upon the article conforming to the irregularities thereof, and holding the wrapper closely thereto until the article is discharged.

61. In a device of the class described, stationary and movable wrapping devices, certain of said devices adjustable to receive articles of different size, and gravity acting means moving the articles to be wrapped unsupported from beneath through the field of operation of said wrapping devices.

62. In a wrapping machine for applying a wrapper to an article, yieldable means for holding the wrapper closely to the article after wrapping comprising a plurality of links each having a plurality of enlarged apertures therethrough, and flexible wires threaded through the apertures of said links to loosely and flexibly connect the same one to another.

63. In a device for holding a wrapper closely around an article, a plurality of loosely connected non-flexible links, and flexible means connecting said links one to another.

64. A wrapping machine adapted to apply a wrapper on an article comprising means for folding the wrapper upwardly around the sides and ends of the article, mechanisms for creasing the warped corner portions of the wrapper inwardly in overlapped relation over the ends of the article, linearly movable means operating subsequently to fold a side portion inwardly over the article, pivoted folder plates adapted to crease the ends of said end folded portions downwardly over said folded side portion on top of the article, a carriage mechanism for actuating said linearly movable means and said pivoted plates, and means folding the other side portion over the top of the article.

65. In a wrapping machine of the class described a wrapping chute, folder plate members forming a part thereof disposed one above the other adapted to crease folds of the wrapper in successive order in overlapped relation on the ends of the article as the same is passed through said chute, means acting gravitationally for moving the article through said chute, and mechanisms completing the folding operation on the wrapper after passage thereof through said chute.

66. In a wrapping machine of the class described feeding mechanism for articles, gravitationally acting mechanism released thereby to engage an article and remove the same from said feeding means, folder devices adapted to receive said article passed through the field of operation thereof by said gravitationally acting mechanisms, and means acting subsequently to heat the wrapper and hold the same closely to the article to seal the same thereon.

In testimony whereof we have hereunto subscribed our names in the presence of two subscribing witnesses.

CHESTER T. DRAKE.
JOHN L. NEEDHAM.

Witnesses:
LAWRENCE REIBSTEIN,
CHARLES W. HILLS, Jr.